(12) United States Patent
Tamura

(10) Patent No.: US 7,979,972 B2
(45) Date of Patent: Jul. 19, 2011

(54) METHOD FOR ASSEMBLING FLEXIBLE MOLDING MAIN BODY PART AND COVER PART AS MOLDING

(75) Inventor: Tatsuya Tamura, Obu (JP)

(73) Assignee: Tokai Kogyo Company Limited, Obu (JP)

( * ) Notice: Subject to any disclaimer, the term of this patent is extended or adjusted under 35 U.S.C. 154(b) by 332 days.

(21) Appl. No.: 12/318,215

(22) Filed: Dec. 23, 2008

(65) Prior Publication Data

US 2009/0113691 A1 May 7, 2009

Related U.S. Application Data

(62) Division of application No. 10/937,349, filed on Sep. 10, 2004, now Pat. No. 7,484,287.

(51) Int. Cl.
*B23P 11/02* (2006.01)

(52) U.S. Cl. .......................................... 29/451; 29/527.1

(58) Field of Classification Search ................... 29/449, 29/450, 451, 527.1, 527.2; 246/177.1, 177.17, 246/177.19, 285, 339
See application file for complete search history.

(56) References Cited

U.S. PATENT DOCUMENTS

| | | | | |
|---|---|---|---|---|
| 2,052,585 A | * | 9/1936 | Tannewitz | 428/122 |
| 2,716,787 A | * | 9/1955 | Harris | 49/492.1 |
| 3,059,292 A | * | 10/1962 | Harris | 49/492.1 |
| 3,110,938 A | * | 11/1963 | Beck et al. | 49/492.1 |
| 3,193,884 A | * | 7/1965 | Haynie et al. | 425/400 |
| 3,886,250 A | * | 5/1975 | Danko | 264/177.19 |
| 4,059,564 A | * | 11/1977 | Coughlan et al. | 264/46.4 |
| 4,081,504 A | * | 3/1978 | Wenrick et al. | 264/171.21 |
| 4,087,223 A | * | 5/1978 | Angioletti et al. | 425/112 |
| 4,291,076 A | * | 9/1981 | Katoh | 428/31 |
| 4,318,764 A | * | 3/1982 | VanManen | 156/244.11 |
| 4,676,856 A | * | 6/1987 | Shigeki et al. | 156/201 |
| 4,719,069 A | * | 1/1988 | Reymann et al. | 264/296 |
| 4,851,067 A | * | 7/1989 | Ogawa et al. | 156/244.18 |
| 4,934,100 A | * | 6/1990 | Adell | 49/462 |
| 4,967,836 A | * | 11/1990 | Nakamura | 165/173 |
| 5,057,265 A | * | 10/1991 | Kunert et al. | 264/511 |
| 5,125,185 A | * | 6/1992 | Shiota et al. | 49/377 |
| 5,302,333 A | * | 4/1994 | Capriotti et al. | 264/177.19 |
| 5,343,609 A | * | 9/1994 | McManus | 29/451 |
| 5,346,662 A | * | 9/1994 | Black et al. | 264/138 |
| 5,421,940 A | * | 6/1995 | Cornils et al. | 156/244.11 |
| 5,540,477 A | * | 7/1996 | Mori | 296/146.15 |
| 5,561,003 A | * | 10/1996 | Nowosiadly | 428/99 |
| 5,804,018 A | * | 9/1998 | Fisher et al. | 156/245 |
| 5,993,713 A | * | 11/1999 | de la Puerta et al. | 264/160 |

(Continued)

*Primary Examiner* — Rick K Chang
(74) *Attorney, Agent, or Firm* — Oliff & Berridge, PLC

(57) ABSTRACT

A method for assembling a molding, including pre-assembling a molding by placing one of two inwardly bent longitudinal edges of a cover in a groove in a flexible main body, the groove receiving one of the two edges; placing the molding in a fixture so that the cover cannot be substantially flexed when a pushing force is applied to the molding; applying a pushing force to the main body of the molding, causing the main body to flex or compress under the pushing force; sliding the main body past the other of the two edges of the cover; seating the other of the two edges of the cover in another groove by releasing the pushing force allowing the main body to return toward an unflexed and uncompressed state inside the channel of the cover so the two parts form an assembled molding; and removing the assembled molding from the fixture.

22 Claims, 11 Drawing Sheets

U.S. PATENT DOCUMENTS

| | | | |
|---|---|---|---|
| 6,034,320 A * | 3/2000 | Malcherczyk et al. | 136/251 |
| 6,070,363 A * | 6/2000 | Vance | 49/377 |
| 6,086,806 A * | 7/2000 | Weatherall et al. | 264/152 |
| 6,141,854 A | 11/2000 | Mueller et al. | |
| 6,742,304 B1 | 6/2004 | Mueller et al. | |
| 6,824,722 B1 | 11/2004 | Cornils et al. | |
| 6,890,464 B2 * | 5/2005 | Suzuki | 264/134 |
| 6,988,733 B2 * | 1/2006 | Hatch | 277/571 |

* cited by examiner

Fig. 7 (PRE-ASSEMBLY)

METHOD FOR ASSEMBLING FLEXIBLE MOLDING MAIN BODY PART AND COVER PART AS MOLDING

This is a Division of application Ser. No. 10/937,349 filed Sep. 10, 2004. The disclosure of the prior application is hereby incorporated by reference herein in its entirety.

BACKGROUND OF THE INVENTION

1. Field of Invention

This invention is directed to systems and methods for assembling moldings, such as belt-line window moldings for motor vehicles.

2. Description of Related Art

A variety of systems and methods are conventionally used to fabricate and/or assemble window moldings such as, for example, window moldings for motor vehicles which are designed to seal the opening between the body of the motor vehicle and a movable motor vehicle window glass such as, for example, the movable window glass located in the door of an automobile. These window moldings are commonly referred to as belt-line window moldings.

U.S. Pat. Nos. 6,141,854 to Mueller et al. and 6,742,304 to Mueller et al., the disclosures of which are incorporated herein by reference in their entirety, teach that a belt-line window molding is fixed to a vehicle body and provides a sealing engagement with the periphery of the window glass to prevent environmental elements or other obstructions from entering the area between the body structure and the movable window glass of a motor vehicle. The Mueller et al. patents teach a typical window molding of a two-part construction including a main body part which, although functional, may not be aesthetically pleasing, and a decorative or ornamental metal cover member designed to hide the functional main body part behind a painted, anodized, chrome-plated or otherwise decoratively treated ornamental cover.

Conventionally, such metal cover members are secured to functional main body parts of motor vehicle belt-line window moldings in widely varied ways. The Mueller et al. patents catalog a number of these conventional methods for mating, assembling and/or otherwise securing a metal cover member of such a molding to a functional main body part of the molding. Disadvantages associated with each method are noted. The Mueller et al. patents propose to overcome enumerated shortfalls in previous methods by providing a method of assembling a belt-line window molding for a motor vehicle door, wherein the belt-line molding includes a main body part with a rigid internal construction of aluminum, steel, hardened plastic, PVC or other rigid material, and a metal cover part having a channel configuration of a C-shaped profile intended to cover an exposed portion of the main body part. The disclosed method includes placing one edge of the metal cover part into an edge receiving groove of the main body part, pivoting the metal cover part generally about that edge such that the opposite edge of the metal cover part engages a rigid portion of the main body part, outwardly flexing the channel configuration of the metal cover part in order to slide the edge across the rigid portion of the main body part, and inwardly flexing the metal cover part to complete the assembly of the metal cover part onto the rigid portion of the main body part. The result is an assembled belt-line window molding for a motor vehicle.

SUMMARY OF THE INVENTION

Restrictions in product design and manufacturing flexibility are introduced in each of the disclosed conventional methods for assembling belt-line window moldings for motor vehicles. The method taught by the Mueller et al. patents, in fact, introduces its own disadvantage in that the choice of materials for the metal cover part is restricted by the requirement that the metal cover part be capable of being flexed or bent to open even slightly outwardly and then inwardly during assembly. Accordingly, any material chosen for the metal cover part must exhibit certain flexibility. In other words, hard or rigid metal materials such as chromium-plated metal cover parts, anodized aluminum metal cover parts and the like may not be usable in the assembly process disclosed in the Mueller et al. patents. Additionally, undesirable deformation and/or cracks in painted surface layers may occur when metal cover parts fabricated from more rigid materials with harder decorative finishes are bent outwardly and then inwardly during an assembly process. Such deformation or cracking would adversely affect the intent behind inclusion of such a metal cover part, i.e., to enhance the decorative or ornamental appearance of the motor vehicle on which it is installed by substantially hiding a less aesthetically pleasing functional main body part.

In various exemplary embodiments, the systems and methods according to this invention seek to overcome the shortfalls identified above by, for example, providing systems and methods for assembling moldings, such as, for example, belt-line window moldings for motor vehicles, in a cost-effective manner without restricting the choice of materials selected for fabrication of a decorative, ornamental or otherwise functional cover part designed to cover less aesthetically pleasing exposed portions of a functional main body part.

In various exemplary embodiments of the systems and methods according to this invention, a molding, such as, for example, a belt-line window molding for a motor vehicle, may be produced by mating or assembling a cover part to at least a flexible portion of a functional main body part in an assembly process or apparatus.

In various exemplary embodiments of the systems and methods according to this invention, at least a flexible portion of a functional main body part of a window molding is at least one of compressed and forced into a cover part with a channel configuration and substantially C-shaped cross-section, the flexible and elastic properties of the main body part facilitating an assembly process.

In various exemplary embodiments of the systems and methods according to this invention, an exemplary apparatus may be provided to introduce at least one of a pushing force, a compressing force and a pulling force to at least a flexible portion of a functional main body part to facilitate assembling a cover part to at least a flexible portion of a functional main body part.

In various exemplary embodiments, the systems and methods according to this invention may further provide at least one molding receiving fixture usable to substantially rigidly hold a cover part substantially ensuring that the cover part is adequately supported such that the cover part is not bent or otherwise excessively deformed during an assembly process.

In various exemplary embodiments of the systems and methods according to this invention, during an assembly or mating process, a relatively flexible functional main body part is deformed in such a manner to facilitate assembly of a molding such as, for example, a belt-line window molding for a motor vehicle, substantially by mating the relatively flexible functional main body part to a rigidly held decorative or ornamental cover part, such as, for example, a metal cover part.

These and other features and advantages of the disclosed embodiments are described in, or are apparent from, the following detailed description of various exemplary embodiments of the systems and methods according to this invention.

BRIEF DESCRIPTION OF THE DRAWINGS

Various exemplary embodiments of the systems and methods according to this invention will be described in detail, with reference to the following figures, wherein like numerals represent like parts, and wherein.

DETAILED DESCRIPTION OF PREFERRED EMBODIMENTS

The following description of various exemplary embodiments of systems and methods for fabricating, manufacturing or facilitating assembly of a molding, such as, for example, a belt-line window molding for a motor vehicle, will refer to a typical two-piece belt-line window molding including at least a functional main body part and a cover part. In the various exemplary embodiments of the systems and methods according to this invention, the functional main body part is of a substantially flexible construction and the cover part is of a substantially less flexible construction than is the functional main body part, the cover part comprising a channel configuration, a substantially C-shaped cross-section, and a decorative or ornamental finished external surface or face. This construction of an exemplary two-piece belt-line molding is described and depicted herein for ease of depiction and for the sake of consistency, clarity and familiarity. However, it should be appreciated that the principles of this invention, as outlined and/or discussed below, can be equally applied to any known or later-developed multi-part molding installation wherein a flexible molding designed to keep environmental elements or other foreign objects out of the void created between a sliding panel, such as, for example, a movable window glass in a motor vehicle, and the surrounding housing body, such as, for example, a motor vehicle body panel or body door panel in which such a movable window glass is housed or within which, more generally, the sliding panel is capable of being extended and retracted. Additionally, it should be recognized that such molding may find utility in not only all or most forms of conventional motor vehicles, but also certain forms of recreation vehicles, certain aircraft, or in other like installations that are not strictly limited to vehicles of any description.

Various exemplary embodiments of the systems and methods according to this invention employ an exemplary apparatus to retain a cover part during an assembly process substantially ensuring that the cover part is not bent or otherwise excessively deformed during an assembly process, and further provide capability to apply a pushing force to compress or otherwise manipulate a flexible main body part as required in order to effect assembly of an exemplary two-piece belt-line molding for a motor vehicle.

Figure 1:
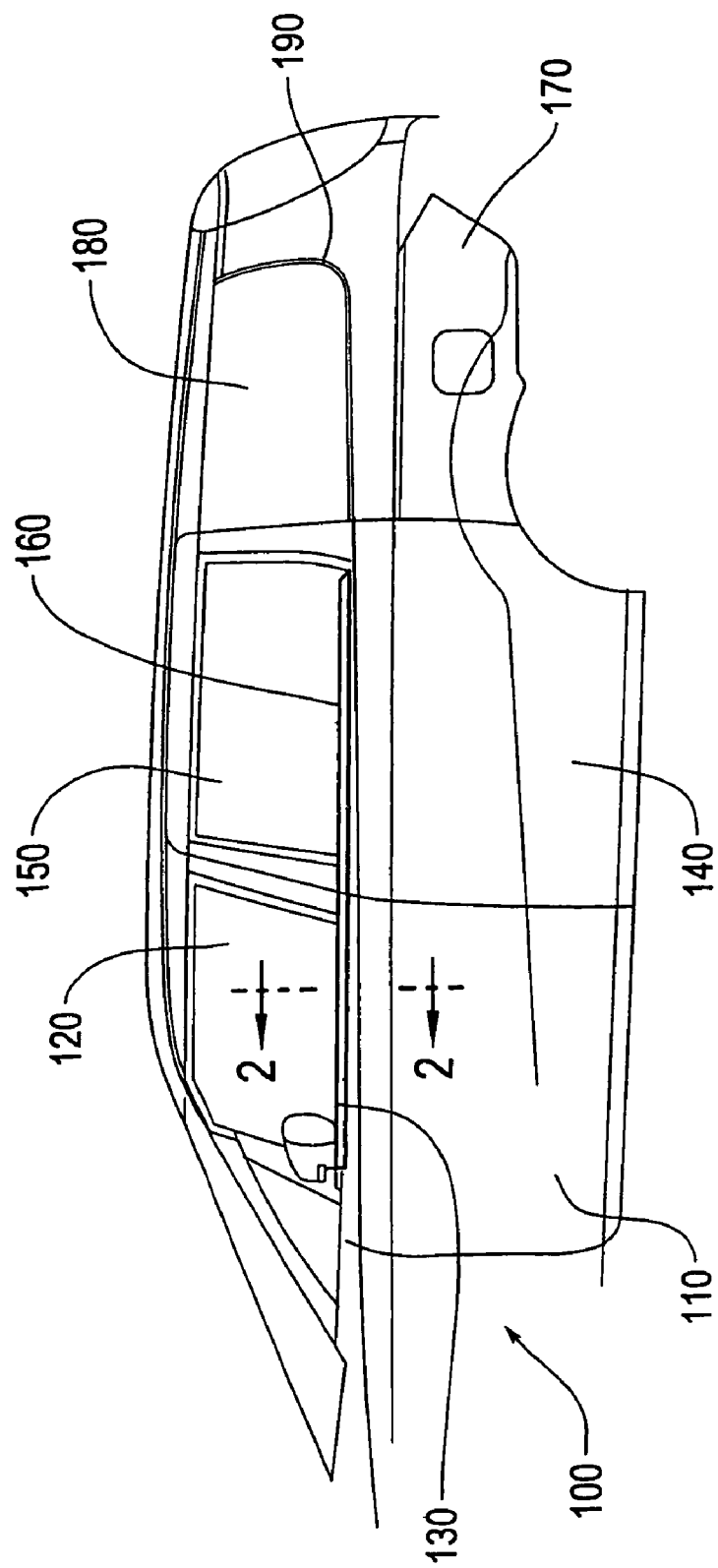
FIG. 1 illustrates a typical general configuration of belt-line window moldings mounted on a motor vehicle.

FIG. 1 illustrates a typical general configuration of belt-line window moldings mounted on a motor vehicle. As shown in FIG. 1, an exemplary motor vehicle 100 includes a front door 110 and a rear door panel 140.

Typically, front and rear movable window panels 120, 150 are provided to retract into the front door 110 and the rear door panel 140. Such capability differentiates these movable window panels 120, 150 from, for example, the exemplary fixed window panel 180 located as an integral part of the rearmost side panel 170 of the exemplary motor vehicle 100.

Belt-line window moldings 130, 160 are generally designed and constructed in such a manner to allow the movable window panels 120, 150 to be extended and retracted freely into door panels 10, 140, while maintaining a substantial seal against environmental elements and/or debris gaining access to the inside of the involved door panels 110, 140 through the gap between the door panels 110, 140 and the movable window panels 120, 150. Such belt-line moldings 130, 160 are different in construction and function then from, for example, an exemplary fixed window molding 190 which surrounds the fixed window panel 180.

Figure 2:
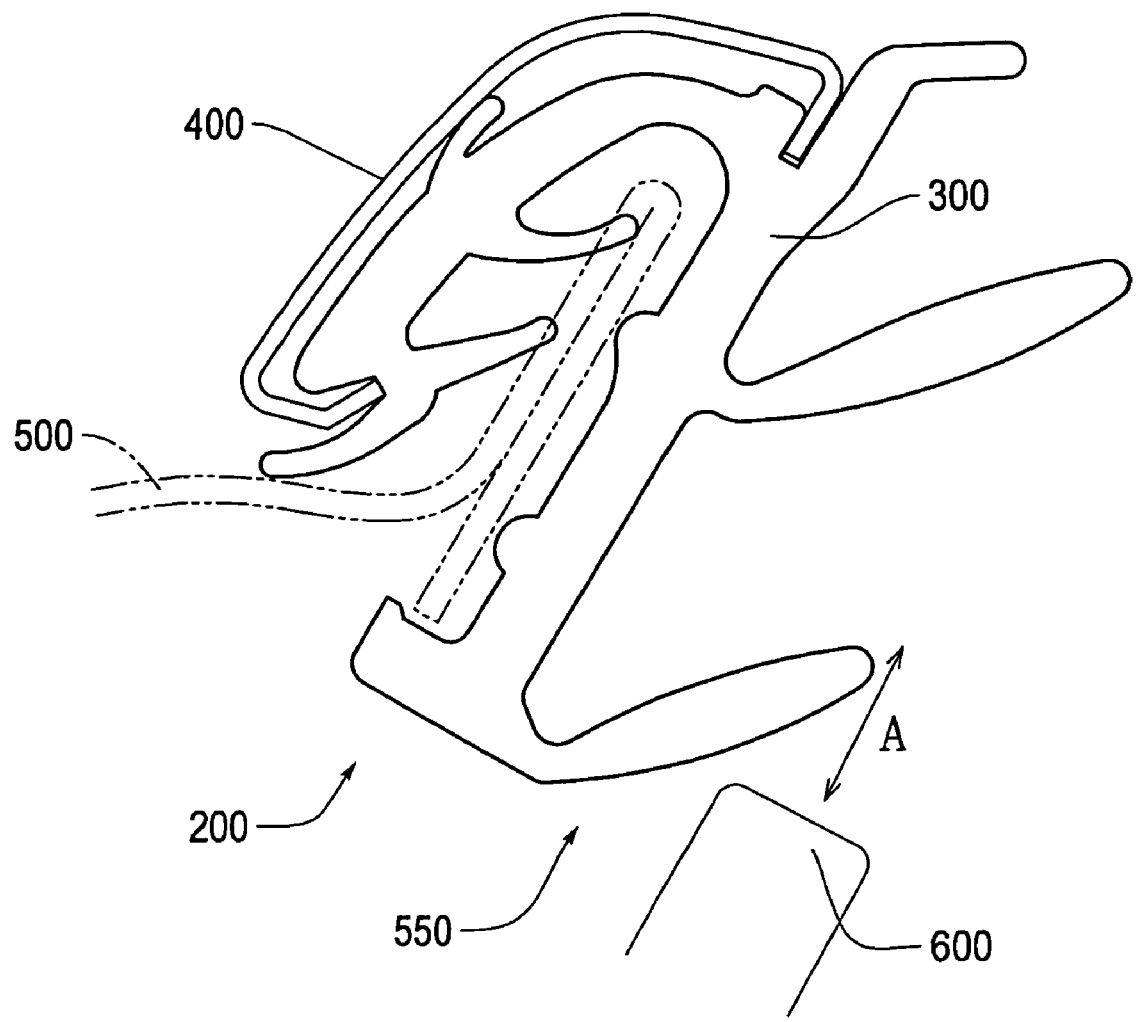
FIG. 2 illustrates a cross-sectional view taken along a line 2-2 in FIG. 1 of an exemplary embodiment of a two-piece belt-line window molding for a motor vehicle, assembled using exemplary systems and methods according to this invention, in a typical motor vehicle installation.

FIG. 2 illustrates a cross-sectional view of an exemplary embodiment of a two-piece belt-line window molding 200 for a motor vehicle, assembled using exemplary systems and methods according to this invention, in a typical motor vehicle installation. As shown in FIG. 2, the exemplary two-piece belt-line window molding 200 comprises a flexible, functional main body part 300 and a cover part 400. The assembled two-piece belt-line window molding 200 is typically mounted on the bottom of a window opening of a vehicle outer door or body panel 500. Protrusions from the flexible main body part 300 (as will be discussed in detail below) of the exemplary two-piece belt-line molding 200 rest against a movable window glass 600 of the motor vehicle, which freely extends and retracts in directions depicted by the arrows at A in the vehicle outer door or body panel 500, substantially sealing the top of a void 550 between the vehicle outer door or panel 500 and the movable window glass 600 from intrusion of environmental elements, debris or other obstructions. The cover part 400 is added in order to give the exemplary two-piece belt-line window molding 200 a more aesthetically pleasing appearance and/or to add a level of protection against damage when mounted to the outer door or body panel 500 of the motor vehicle.

Figure 3A:
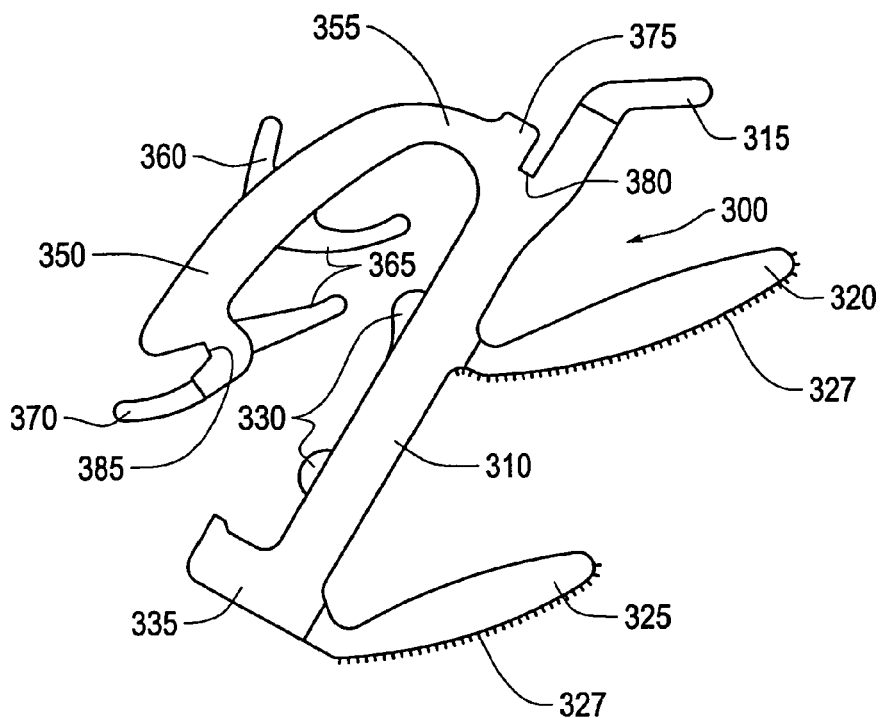
FIGS. 3A and 3B illustrate a cross-sectional view of an exemplary embodiment of a flexible, functional main body part usable to form a two-piece belt-line molding for a motor vehicle with the exemplary systems and methods according to this invention.
Figure 3B:
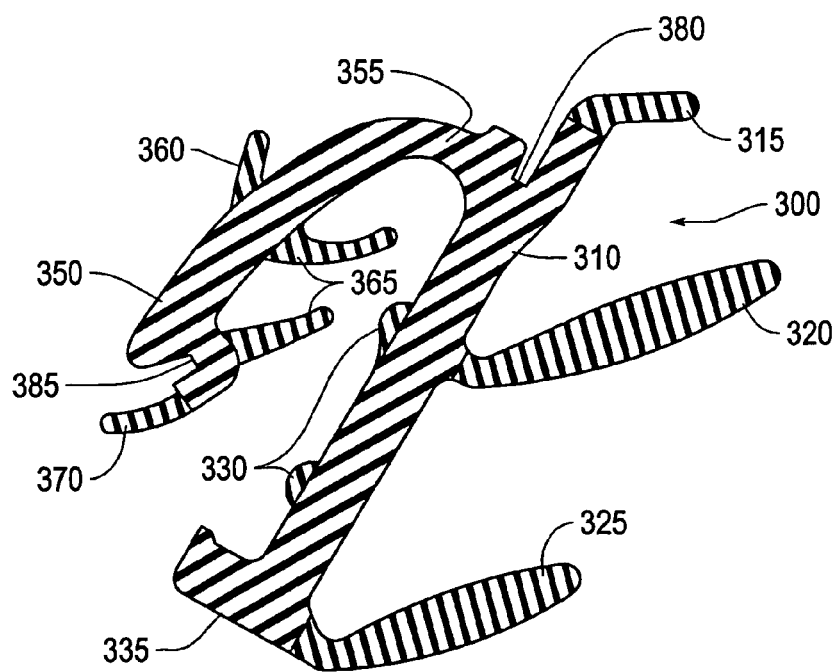

FIGS. 3A and 3B illustrate a cross-sectional view of an exemplary embodiment of a flexible, functional main body part 300 usable to form a two-piece belt-line molding for a motor vehicle with the exemplary systems and methods according to this invention. As shown in FIGS. 3A and 3B, the exemplary flexible main body part 300 includes an interior portion 310 and an exterior portion 350.

The interior portion 310 of the exemplary flexible main body part 300 further includes a concealing lip 315, an upper seal lip 320, a lower seal lip 325, at least one door panel contacting projection 330 (two shown), and a lower mounting projection 335.

The exterior portion 350 of the exemplary flexible main body part 300 further includes a thinner flexing portion 355 which, as detailed below, further facilitates flexing of the flexible main body part 300 during an assembly process. In other words, it is this thinner flexing portion 355 of the exterior portion 350 of the flexible main body part 300 which is most easily compressed or otherwise deformed during an assembly process so that the flexible main body part 300 can be manipulated and pushed to fit inside a non-flexible metal cover part 400 to achieve a final assembly of a two-piece belt-line window molding 200 (as shown in FIG. 2) when a pushing force is applied by an assembly apparatus. Preferably, the thinner flexing portion 355 gradually decreases in thickness from the rest of the exterior portion 350 of the exemplary flexible main body part 300 such that the thinner flexing portion 355 may be smoothly bent in an assembly process.

The exterior portion 350 of the exemplary flexible main body part 300 further includes a spring lip 360 which is usable to help ensure that an installed cover part 400, as shown in FIG. 2, is firmly held in place and will not, for example, rattle loosely when the two-piece belt-line window molding 200 is installed on a motor vehicle as shown in FIG. 2. The exterior portion 350 of the exemplary flexible main body part 300 also includes at least one door panel holding lip 365 (two shown), a lower cushion lip 370 and a projecting upper ridge 375. Further, the exterior portion 350 of the exemplary flexible main body part 300 includes an upper groove 380 and a lower groove 385 to accommodate upper and lower inwardly bent longitudinal edges of a non-flexible cover part 400, as shown in FIG. 2.

The shading of the various portions of the exemplary flexible main body part 300 depicted in FIG. 3B is intended to indicate that, in construction of an exemplary flexible main body part 300, rubber-like elastic materials are employed such as, for example, thermoplastic elastomers and thermoplastic resins. Varying compositions of these materials are chosen in order that the concealing lip 315, upper seal lip 320, lower seal lip 325, at least one door panel contacting projection 330, spring lip 360, at least one door panel holding lip 365 and the lower cushion lip 370 may be fabricated from such a material which has a hardness which has a different hardness (preferably less hardness) than that of the rest of the exemplary flexible main body part 300. For example, the hardness of one or more of these other elements may be about one half that of the rest of the main body part 300. It should be understood, however, that this variable construction with rubber-like materials of varying hardness does not imply that the rest of an exemplary flexible main body part 300, i.e., the interior portion 310, lower projecting portion 335, exterior portion 350 and particularly the thinner flexing portion 355, is rendered, in any way, non-flexible or inflexible.

In an exemplary manner, the flexible main body part 300 is preferably fabricated from an elastic resin, like polypropylene resin, nylon resin, thermoplastic elastomer, or semi-hard rubber, each having a Durometer Hardness between HDD 45 degree and HDD 70 degree, wherein HDD represents Durometer Hardness, formerly Shore D Hardness. Also in an exemplary manner, at least one of the concealing lip 315, upper seal lip 320, lower seal lip 325, at least one door panel contacting projection 330, spring lip 360, at least one door panel holding lip 365 and the lower cushion lip 370 is preferably fabricated from elastic elastomer or soft rubber, each having Durometer Hardness between HDA 50 degree and HDA 90 degree, where HDA is Durometer Hardness, formerly Shore A Hardness. For reference, it should be understood that HDA 100 degree nearly equals HDD 45 degree.

Additionally, the exterior of at least one of the concealing lip 315, the upper seal lip 320 and the lower seal lip 325 can be covered in a different material, such as nylon pile flock material 327 (shown here in exemplary manner on the upper and lower seal lips 320, 325), in order to better allow these lips to slide along the surface of the window glass 600 depicted in FIG. 2 as the window glass 600 is extended or retracted in directions A.

Figure 4:
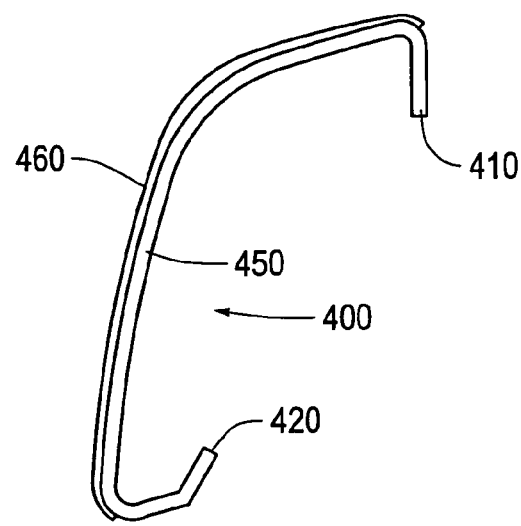
FIG. 4 illustrates a cross-sectional view of an exemplary embodiment of a substantially C-shaped cover part with a channel configuration usable to form a two-piece belt-line molding for a motor vehicle with the exemplary systems and methods according to this invention.

FIG. 4 illustrates a cross-sectional view of an exemplary embodiment of a substantially C-shaped cover part 400 with a channel configuration usable to form a two-piece belt-line molding 200 for a motor vehicle with the exemplary systems and methods according to this invention. As shown in FIG. 4, an exemplary cover part 400 includes a main face or decorative surface 450 which can be optionally covered with a protective covering 460 to protect the main face or decorative surface 450 during an assembly process as outlined below. The protective cover 460 may include, for example, a removable adhesive tape or film which is designed simply to help ensure that the main face or decorative surface 450 of the exemplary cover part 400 is not damaged or marred in any way during an assembly process. Further, the channel configuration and substantially C-shaped design of the exemplary cover part 400 includes an inwardly bent longitudinal upper edge 410 and an inwardly bent longitudinal lower edge 420 which are inwardly bent to facilitate an assembly process.

It should be appreciated that an exemplary non-flexible cover part 400 may be formed of any suitable material, often a sheet metal strip, regardless of hardness or rigidity because concern regarding flexibility of the exemplary cover part 400 is obviated by an assembly process using the systems and methods according to this invention. The main face or decorative surface 450 of the exemplary cover part 400 may be polished, chrome-plated, anodized, painted or otherwise finished in order to provide a decorative or ornamental appearance without concern that bending or other excessive deformation of the exemplary cover part 400 during an assembly process may result in cracking or other damage to the finish.

In various systems and methods according to this invention, concerns regarding fabrication and finishing of an exemplary cover part 400 prior to an assembly process where the exemplary cover part 400 is mated to an exemplary flexible main body part 300, as shown in FIGS. 2, 3A and 3B, are largely eliminated. The exemplary cover part 400 can be rigidly manufactured and then finished with an understanding that, in the systems and methods according to this invention, at least the main face or decorative surface 450 of the exemplary metal cover part 400 will be rigidly held and otherwise protected, and thereby not substantially allowed to bend or otherwise excessively deform, during the assembly process.

It should be appreciated that the exemplary cover part 400 may be made from highly rigid and non-flexible materials. Alternatively, the exemplary cover part may be made from materials which allow the exemplary cover part 400 to be slightly elastically deformed, generally outwardly, during an assembly process as long as such exemplary cover part 400 does not elastically deform far enough during the assembly process that the exemplary cover part 400 is damaged. When the exemplary cover part 400 is made for example, from a stainless steel or aluminum sheet, preferable sheet thicknesses may range from 0.25 mm to 0.70 mm. Such sheet thickness may more preferably be in a range of 0.35 mm to 0.60 mm, and most preferably in a range of 0.40 mm to 0.50 mm.

Figure 5:
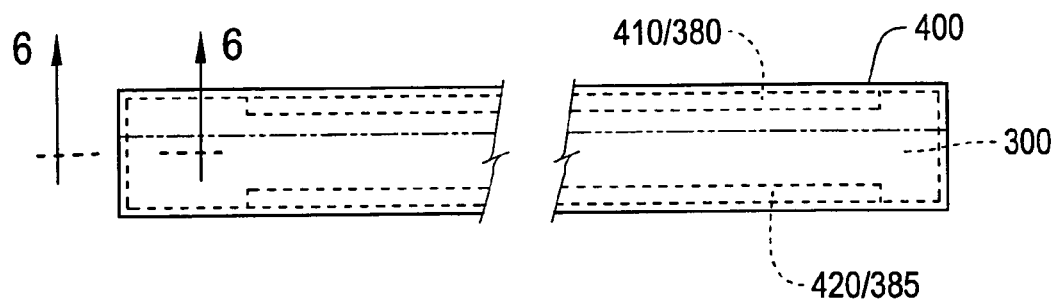
FIG. 5 illustrates a front view of an exemplary embodiment of the cover part.

FIG. 5 illustrates a front view of an exemplary embodiment of the cover part. As will be further detailed below, the inwardly bent longitudinal upper and lower edges 410, 420 of the cover part 400 are substantially engaged in upper and lower grooves 380, 385 of the exterior portion 350 (FIGS. 3A and 3B) of the flexible main body part 300.

Figure 6:
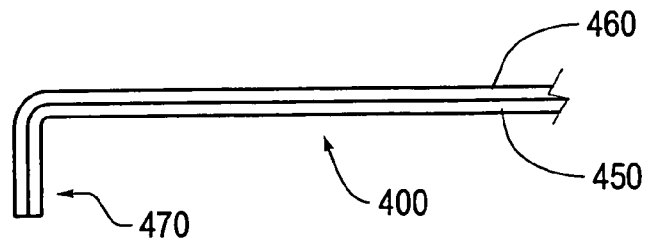
FIG. 6 illustrates a sectional view taken along a line 6-6 in FIG. 5 of an end of an exemplary cover part usable to form a two-piece belt-line window molding for a motor vehicle with the exemplary systems and methods according to this invention.

FIG. 6 illustrates a sectional view along a line 6-6 in FIG. 5 of an exemplary cover part 400 usable to form a two-piece belt-line window molding for a motor vehicle with the exemplary systems and methods according to this invention. FIG. 6 is included to show that the ends 470 of the exemplary cover part 400 can be pre-bent at some angle (to include more or less than the approximately 90° depicted) in order to aid in further substantially hiding a longitudinal end of the flexible main body part 300 from view. During assembly, a longitudinal end of the flexible main body part 300 may be placed inside the pre-bent end 470 of the exemplary cover part 400 in order to ensure that it remains hidden thereunder.

Figure 7:
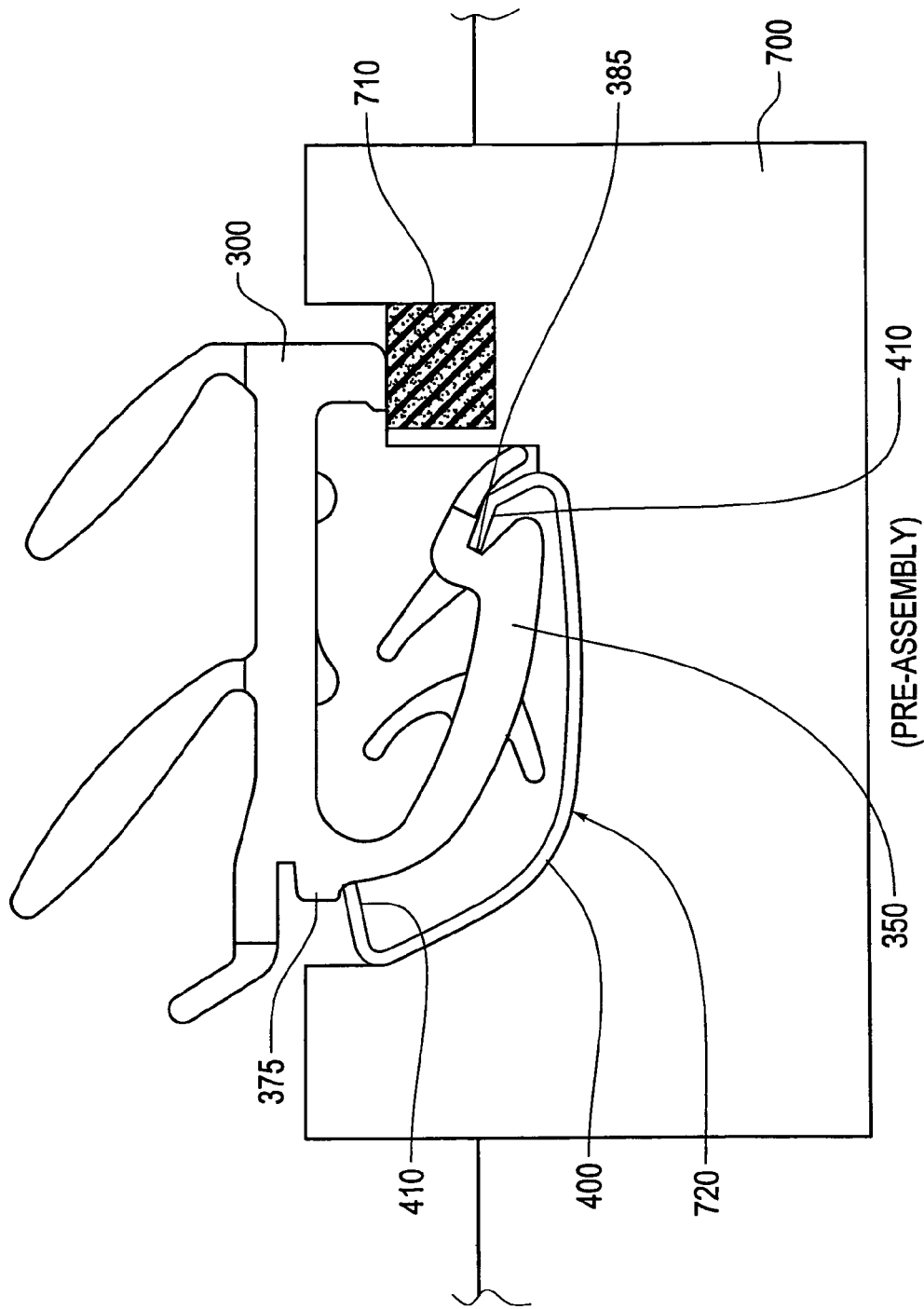
FIG. 7 illustrates a cross-sectional view of an exemplary molding receiving fixture usable for supporting a cover part in an exemplary apparatus for facilitating assembly of a two-piece belt-line window molding for a motor vehicle with the systems and methods according to this invention.

FIG. 7 illustrates a cross-sectional view of an exemplary molding receiving fixture 700 usable for supporting a cover part 400 in an exemplary apparatus for facilitating assembly of a two-piece belt-line window molding for a motor vehicle with the systems and methods according to this invention. As shown in FIG. 7, a cover part 400 is laid in the exemplary molding receiving fixture 700 such that the cover part 400 is supported by a molding accommodating groove 720 in the molding receiving fixture 700. The molding accommodating groove 720 may be configured to precisely and rigidly support the cover part 400 during an assembly process. In this manner, the cover part 400 is substantially kept from being bent or otherwise excessively deformed, or damaged, during an assembly process.

Note that the inwardly bent longitudinal lower edge 420 of the cover part 400 has been preset in the lower groove 385 of the exterior portion 350 of the flexible main body part 300. Additionally, the inwardly bent longitudinal upper edge 410 of the cover part 400 rests against the projecting upper ridge 375 of the exterior portion 350 of the flexible main body part 300. This can be considered a pre-assembly positioning of the flexible main body part 300 and the cover part 400 in the exemplary molding receiving fixture 700.

The exemplary molding receiving fixture 700 may be constructed from a hard and rigid elemental or manufactured material such as, for example, a resin like polyacetal, nylon, or polyurethane, or from a hard and rigid wood such as, for example, oak. Alternatively, in order to facilitate the cover part 400 being able to be slightly elastically deformed outwardly during an assembly process, the molding receiving fixture 700 may be preferably made from an elastic material that slightly elastically deforms under the force exerted in an assembly process. In such an exemplary embodiment, a semi-hard rubber material, having a hardness similar to that of, for example, a vehicle rubber tire, or a polyurethane resin material such as that typically marketed as a component of a press forming die (commonly known as "urethane die pads"), are preferable. The exemplary molding receiving fixture 700 may optionally include at least one sponge-like absorber 710 usable to optimize the effect of a pushing force exerted against an exemplary main body part 300 during an assembly process to provide optimal compression and manipulation of a flexible main body part 300 to aid in mating of the flexible main body part 300 with a rigidly held cover part 400.

It should be appreciated that different exemplary molding receiving fixtures 700, with molding accommodating grooves 720 designed specifically to each hold one type of cover part 400, may be required in order to support assembly of differing two-piece belt-line window moldings for motor vehicles with the systems and methods according to this invention. Although the molding accommodating grooves 720 of such exemplary different molding receiving fixtures 700 may differ, the external dimensions of the different molding receiving fixtures 700 can be made of standard dimensions in order that the different molding receiving fixtures 700 are interchangeable in an exemplary assembly apparatus according to this invention, as detailed below. Such flexibility is desirable and advantageous in order to support assembly of a plurality of pre-assembled window moldings, such as, for example, both right side and left side moldings, both front door and rear door moldings, or any combination of two or more molding, the assembly of which constitutes a single assembly operation.

Figure 8:
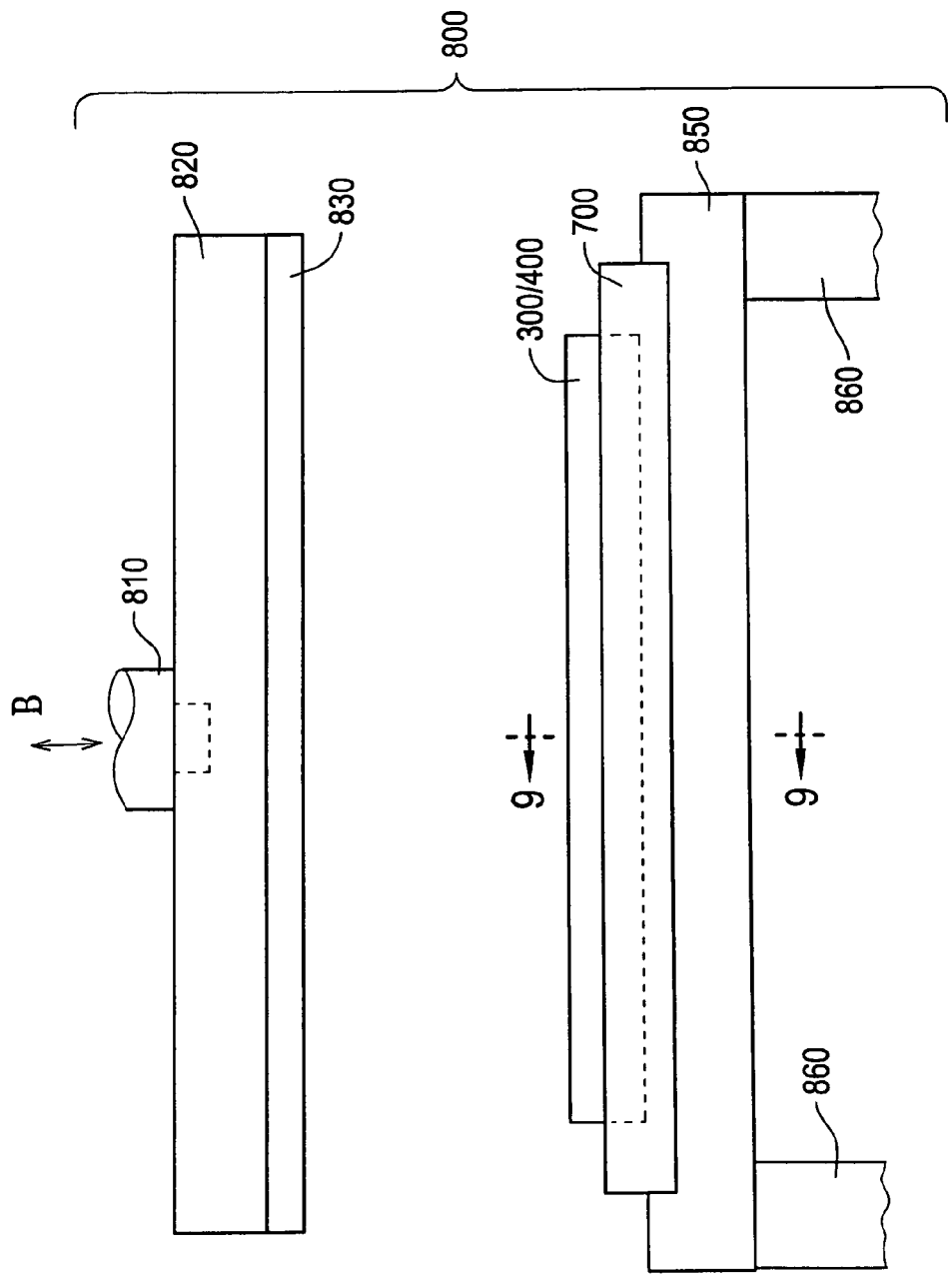
FIG. 8 illustrates a general configuration of a first exemplary embodiment of an apparatus for facilitating assembly of two-piece belt-line window moldings for motor vehicles according to this invention.

FIG. 8 illustrates a general configuration of a first exemplary embodiment of an apparatus 800 for facilitating assembly of two-piece belt-line window moldings for motor vehicles according to this invention. As shown in FIG. 8, the apparatus 800 includes a pushing force device interface 810, an upper support member 820, a pusher face 830, a base member 850, and a base frame 860.

The pushing force device interface 810 is usable to connect the upper support member 820, which is in contact with the pusher face 830, to a pushing force device (not shown) in order to translate an applied pushing force to move the entire upper assembly 810, 820, 830 in a direction depicted as B, which is preferably a substantially vertical direction, in order to exert a pushing force between the pusher face 830 and a pre-assembled two-piece belt-line molding 200 which has been mounted in a molding receiving fixture 700 as shown in FIG. 7. An interchangeable exemplary molding receiving fixture 700 is mounted on or in the base member 850 which, with the base frame 860, provides support against the pushing force exerted by the upper assembly 810, 820, 830 to aid in assembly of the two-piece belt-line molding. The applied pushing force can be exerted from any pushing force device (not shown), i.e., any drive source suitable to exert such a pushing force via the pushing force device interface 810 to the upper support member 820 and pusher face 830. Such pushing force devices include, but are not limited to, hydraulic or pneumatic cylinders or drive units, electric motors, and lever-principle mechanical devices designed to exert such a pushing force.

The base member 850 can accommodate one or more different exemplary molding receiving fixtures 700 which may be interchangeable in order to accommodate varying sizes and/or combinations of two-piece belt-line molding components, and specifically exemplary cover parts 400, in their respective molding accommodating grooves 720. As shown in FIG. 8, an exemplary molding receiving fixture 700 is mounted suitably in or on a base member 850. Additionally, the block 300/400 represents that the two components, a flexible main body part 300 and a metal cover part 400 have been suitably positioned in their pre-assembly position in the exemplary molding receiving fixture 700 as depicted in FIG. 7.

Note that the pusher face 830 will exert a pushing force substantially along an entire axial or longitudinal length of the lower assembly 700/850 containing the components 300 and 400 for the assembly of the two-piece belt-line window molding according to this invention. The pushing force is specifically applied to the flexible main body part 300 of the pre-assembled two piece belt-line window molding mounted in the molding accommodating groove 720 of the molding receiving fixture 700.

Figure 9:
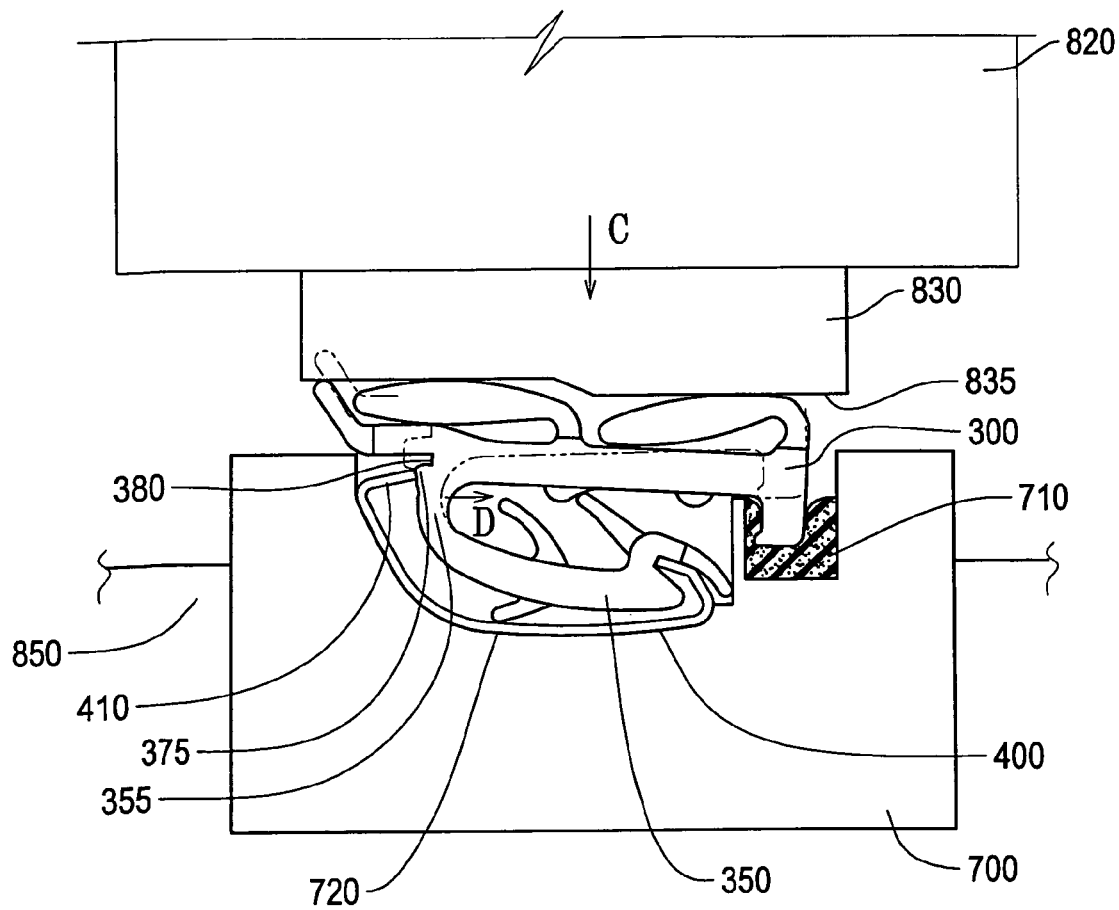
FIG. 9 illustrates a cross-sectional view taken along a line 9-9 in FIG. 8 of the first exemplary embodiment of an apparatus, in operation, for facilitating assembly of two-piece belt-line window moldings for motor vehicles according to this invention.

FIG. 9 illustrates a cross-sectional view taken along a line 9-9 in FIG. 8 of a first exemplary embodiment of an apparatus 800, in operation, for facilitating assembly of two-piece belt-line window moldings for motor vehicles according to this invention. As shown in FIG. 9, a pushing force is being exerted in a direction C on the upper support member 820 and the pushing face 830. The pusher face 830 can be designed and constructed in any manner that will efficiently facilitate proper application of the pushing force as demonstrated by the exemplary bi-level construction of the exemplary pusher face 830 shown in FIG. 9.

As a pushing force is applied, the flexible main body part 300 is flexed, compressed or otherwise elastically inwardly deformed while the cover part 400 is held in the molding accommodating groove 720 of the exemplary molding receiving fixture 700. In this manner, the cover part 400 is not substantially bent or otherwise excessively deformed during application of a pushing force in a direction C in an assembly operation. As the flexible main body part 300 is flexed, compressed or otherwise inwardly elastically deformed during application of the pushing force in the assembly operation, the cover part may slightly elastically outwardly deform as well in order to facilitate the assembly operation.

Note that the at least one sponge-like absorber 710 may be compressed to help optimally spread the pushing force in order to facilitate assembly of the two-piece belt-line molding.

The thinner flexible portion 355 of the exterior portion 350 of the flexible main body part 300, under the pressure of the exerted pushing force, is forced to flex substantially in a direction D. The inwardly bent longitudinal upper edge 410 of the cover part 400 may remain rigid and in place, or may slightly outwardly flex, while the projecting upper ridge 375 of the exterior portion 350 of the flexible main body part 300 is forced, under pressure, to flex, compress or otherwise elastically inwardly deform with the coincident flexing of the thinner flexing 355 of the exterior portion 350 of the flexible main body part 300. The projecting upper ridge 375 of the exterior portion 350 of the flexible main body part 300, once forced past the inwardly bent longitudinal upper edge 410 of the cover part 400, will elastically spring back to its original shape and into place, or un-deform, allowing the inwardly bent longitudinal upper edge 410 of the cover part 400 to engage and substantially seat itself in the upper groove 380 of the exterior portion 350 of the flexible main body part 300 thereby substantially completing the assembly process. The upper support member 820 and the pusher face 830 are then retracted by retraction of the pushing force device interface 810 and the finished two-piece belt-line molding is extracted from the molding accommodating groove 720 of the exemplary molding receiving fixture 700.

Figure 10:
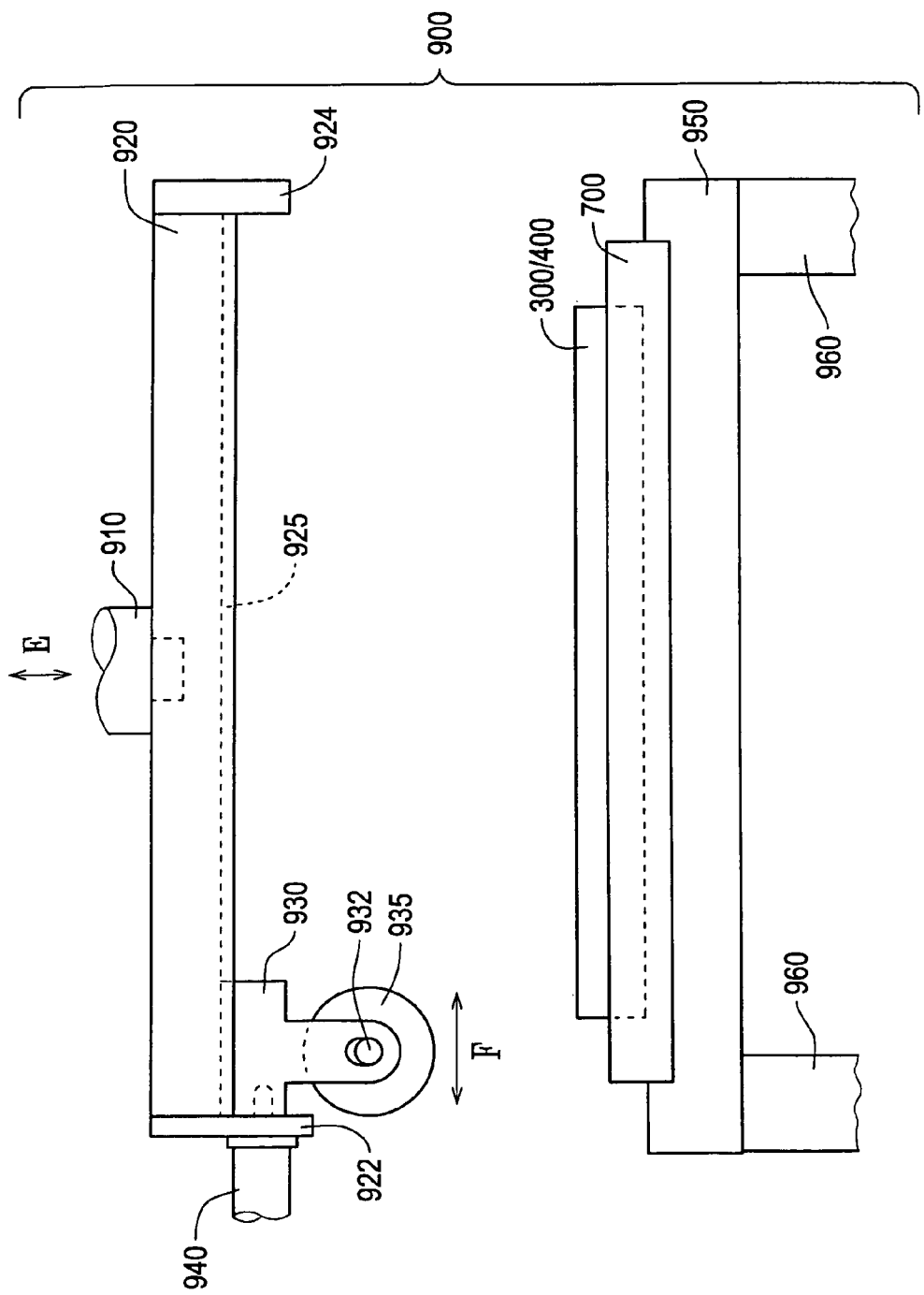
FIG. 10 illustrates a general configuration of a second exemplary embodiment of an apparatus for facilitating assembly of two-piece belt-line window moldings for motor vehicles according to this invention.

FIG. 10 illustrates a general configuration of a second exemplary embodiment of an apparatus 900 for facilitating assembly of two-piece belt-line window moldings for motor vehicles according to this invention. As shown in FIG. 10, the apparatus 900 includes a pushing force device interface 910 which, like the pushing force device interface 810 in FIG. 8 illustrating a first exemplary embodiment of an apparatus 800, provides an interface between a drive source suitable to exert a pushing force such as, for example, a hydraulic or pneumatic cylinder or drive unit, an electric motor, a lever-principle mechanical device, or the like, and an upper support member 920 so that movement of the upper assembly can be effected in directions depicted as E in FIG. 10.

In this exemplary embodiment of an apparatus 900, the upper support member 920 houses a slider groove 925 in which a slidable pusher 930 is mounted and allowed to translate. The slidable pusher 930 includes a pusher roller 935, which rotates about a pusher roller shaft 932, and a driving device such as longitudinal drive source 940. The slidable pusher 930 is allowed to slide under control of the longitudinal drive source 940 in directions as depicted by the arrows F in FIG. 10 between end stoppers 922, 924 mounted to the ends of the upper support member 920. As in the first exemplary embodiment of the apparatus 800, a base member 950 is provided which is configured to securely hold at least one of a plurality of different exemplary molding receiving fixtures 700 which, as shown in FIG. 7 and described above, are usable to facilitate assembly of two-piece belt-line window moldings for motor vehicles.

In the exemplary embodiment shown in FIG. 10, the two components to be assembled, i.e., a flexible main body part 300 and a cover part 400, are depicted in exemplary manner as a single block unit resting in a pre-assembly condition in the exemplary molding receiving fixture 700.

It should be appreciated that although the upper support member 920 is shown as a vertically moving member in the exemplary embodiment depicted in FIG. 10, as was the upper support member 820 in the previous exemplary embodiment depicted in FIG. 8, other exemplary embodiments of the systems and methods according to this invention could be configured such that the upper support member 920 of exemplary apparatus 900 (and in like manner the upper support member 820 of exemplary apparatus 800) is fixed while the base member 950 (or 850), and optionally the base frame 960 (or 860), is movable.

Figure 11:
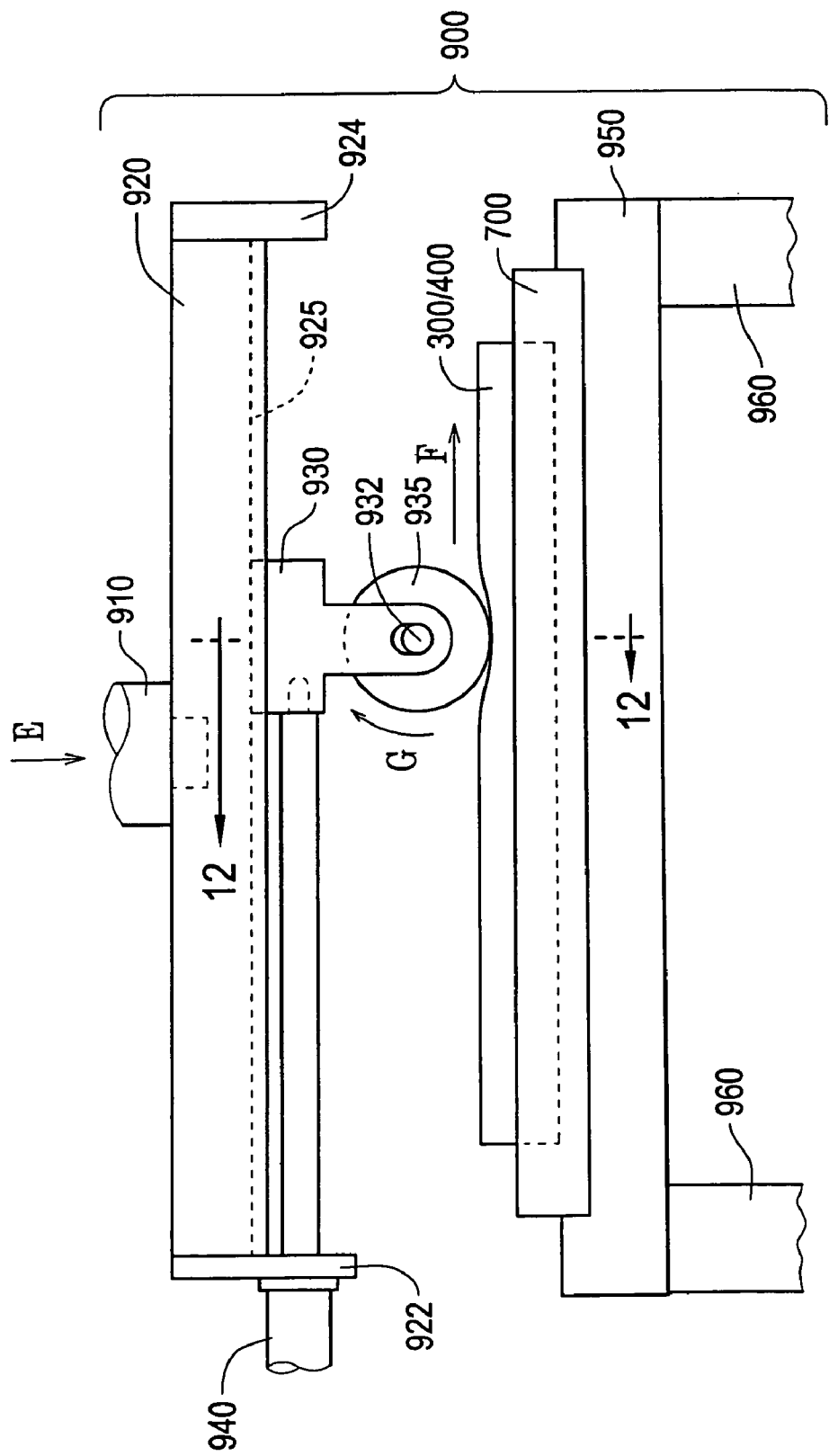
FIG. 11 illustrates a second view of the general configuration of the second exemplary embodiment of an apparatus, in operation, for facilitating assembly of two-piece belt-line window moldings for motor vehicles according to this invention.

FIG. 11 illustrates a second view of the general configuration of the second exemplary embodiment of an apparatus 900, in operation, for facilitating assembly of two-piece belt-line window moldings for motor vehicles according to this invention. As shown in FIG. 11, a pushing force has been exerted from a pushing force device (not shown) translated through the pushing force device interface 910 to an upper support member 920 which has been displaced from its upper or at rest position vertically downward in a direction depicted by arrow E. A pushing force is applied such that the pusher roller 935 of the slidable pusher 930 contacts the pre-assembled two-piece belt-line molding for a motor vehicle mounted in the exemplary molding receiving fixture 700, as shown in FIG. 7, at a single point along the longitudinal or axial length of the pre-assembled molding. Normally, this initial contact point will be at one end or the other of the pre-assembled two-piece belt-line molding. When the pusher roller 935 contacts the pre-assembled two-piece belt-line window molding, the longitudinal drive unit 940 engages to push the slidable pusher 930 in the direction depicted as F such that the pusher roller 935 rotates about the pusher roller shaft 932 in a direction depicted as G. In this manner, a pushing force is applied, not to an entire axial or longitudinal length of a two-piece belt-line molding at the same time, but rather incrementally along the axial or longitudinal length of the two-piece belt-line molding as the pusher roller 935 of the slidable pusher 930 applies the pushing force in a substantially longitudinal motion and the pusher roller 935 rolls along on top of the pre-assembled two-piece belt-line molding mounted in the exemplary molding receiving fixture 700.

Figure 12:
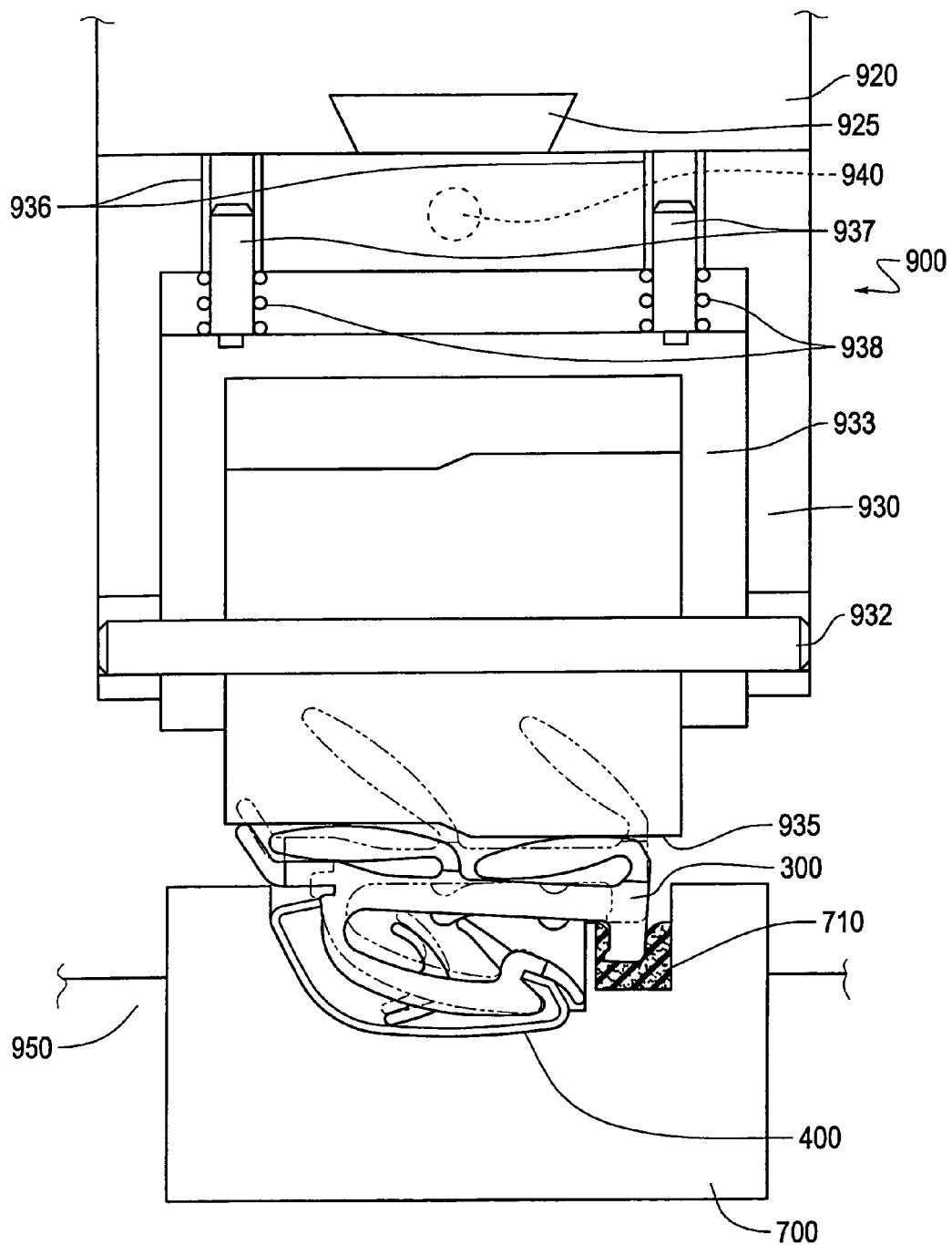
FIG. 12 illustrates a cross-sectional view taken along a line 12-12 in FIG. 11 of the second exemplary embodiment of an apparatus, in operation, for facilitating assembly of two-piece belt-line window moldings for motor vehicles according to this invention.

FIG. 12 illustrates a cross-sectional view taken along a line 12-12 in FIG. 11 of the second exemplary embodiment of an apparatus 900, in operation, for facilitating assembly of a two-piece belt-line window molding for a motor vehicle according to this invention. As shown in FIG. 12, the pushing force has been exerted forcing the upper support member 920 down into its assembly position. The slider groove 925 accommodates the top of the slidable pusher 930 as a type of guide member for the slidable pusher 930. The slidable pusher 930 includes a pusher roller holder 933 that is slightly movable in a vertical direction with respect to the slidable pusher 930, and a roller shaft 932 about which a pusher roller 935 rotates as the pusher roller 935 is forced along the surface of the pre-assembled two-piece belt-line molding by the longitudinal drive member 940. The slight relative vertical movement is enabled by, e.g., the roller shaft 932 interacting with elliptical openings in the walls of the slidable pusher 930, as shown in FIG. 12.

In order to maintain substantially constant pushing force of the pusher roller 935 held by the pusher roller holder 933 against the pre-assembled two-piece belt-line molding, optional compression springs 938 may be provided surrounding slidable guide pins 937 attached to the top of the pusher roller holder 933, the slidable guide pins 937 being able to freely move in a vertical direction in guide bushings 936 of the slidable pusher 930 assembly. Accordingly, the pusher roller 935, the roller shaft 932, the pusher roller holder 933, and the attached guide pins 937, as a complete assembly, may move slightly vertically with respect to the slidable pusher 930 as the pusher roller 935 is forced along the surface of the pre-assembled two-piece belt-line molding by the longitudinal drive member 940. Such variations in vertical displacement of the complete assembly are usable to maintain substantially constant pushing force against the pre-assembled two-piece belt-line molding even when slight variations in the contour of the molding are encountered, while avoiding damage to the molding.

The actual assembly process occurs in essentially the same manner as was described in paragraphs [0052]-[0055] above except that the pushing force is incrementally applied to the flexible main body part 300 of the two-piece belt line molding in the molding receiving fixture 700 rather than being applied to an entire longitudinal length of the flexible main body part 300 at the same time.

Figure 13:
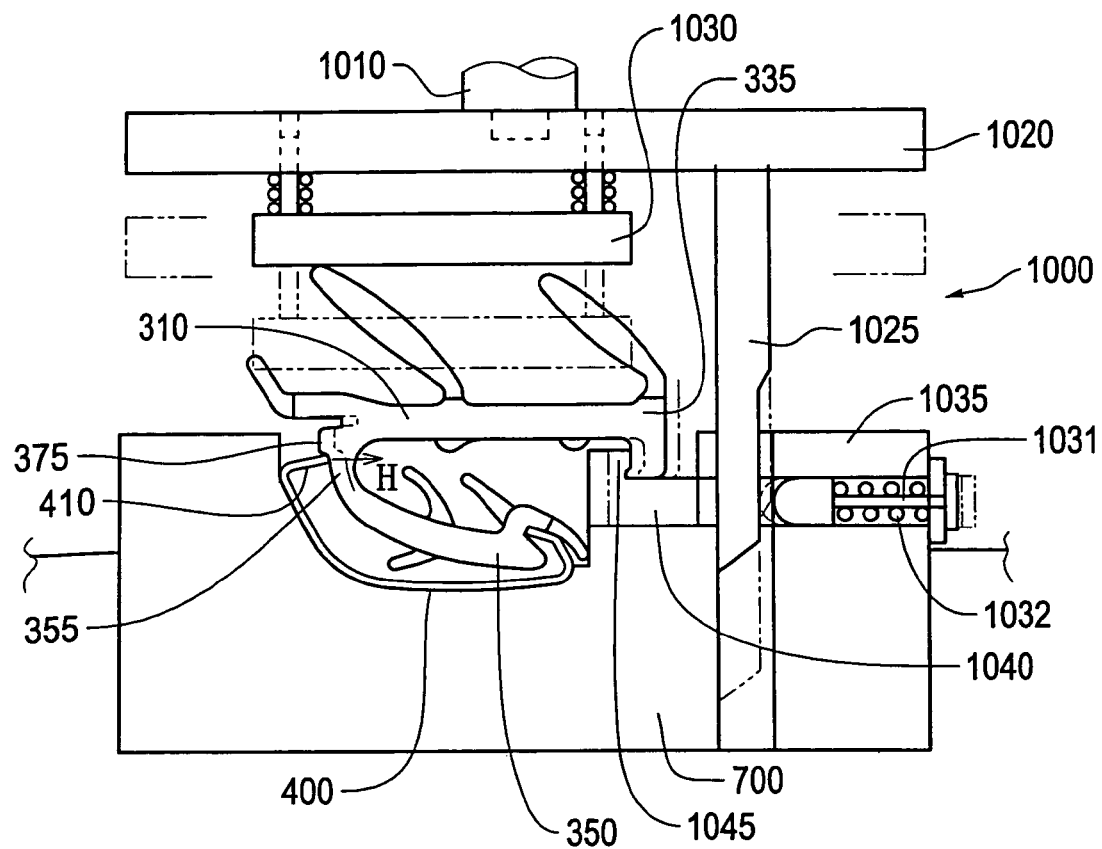
FIG. 13 illustrates a cross-sectional view of a third exemplary embodiment of an apparatus, in operation, for facilitating assembly of two-piece belt-line window moldings for motor vehicles according to this invention.

FIG. 13 illustrates a cross-sectional view of a third exemplary embodiment of an apparatus 1000, in operation, for facilitating assembly of two-piece belt-line window moldings for motor vehicles according to this invention. As shown in FIG. 13, the apparatus includes a pushing force device interface 1010, an upper support member 1020, and a pusher face 1030 which makes contact with a pre-assembled two-piece belt-line window molding seated in a pre-assembly condition wherein the two pieces, i.e., a flexible main body part 300 and a cover part 400, are preliminarily mounted in a pre-assembly phase in an exemplary molding holding fixture 700, as depicted in FIG. 7.

In this exemplary apparatus, a cam 1025 vertically protrudes from the upper support member 1020. As the upper support member 1020 is translated vertically downward under an exerted pusher force, the pusher face 1030 pushes the flexible main body 300 downward, flexing, compressing or otherwise elastically inwardly deforming the flexible main body part 300 as noted in the foregoing descriptions of other embodiments. Simultaneously, the cam 1025 moves vertically downward and a hook point 1045 of a hook-like catcher 1040 connected by an integrating member 1035 to a cam follower 1031 pulls the lower projecting portion 335 of the interior portion 310 of the flexible main body part 300 such that the thinner flexing portion 355 of the exterior portion 350 of the flexible main body part 300 flexes inwardly in a direction depicted as H. This movement allows the inwardly bent longitudinal upper edge 410 of the cover part 400 to more easily slide over the projecting upper ridge 375 of the exterior portion 350 of the flexible main body part 300 before coming to rest and substantially seating itself in the upper groove 380 of the exterior portion 350 of the flexible main body part 300. As an alternative to the cam driven portion of the exemplary apparatus shown, a separate pulling force device (not shown) attached by the same or a separate integrating member to the hook-like catcher 1040 could be employed to exert the pulling force described above.

In this exemplary embodiment, when the pushing force is removed and the upper support member 1020 raises vertically, the cam 1025 allows the cam follower 1031 to move back to the left under, for example, the elastic spring pressure of the flexible main body part 300 simply returning to its unstretched original position, or the cam follower may be augmented in a return to its original position with the aid of at least one optional urging device, such as a coil spring 1032. When the upper support member returns to its upper or at rest position, and the external pushing and tensioning forces are released from the flexible main body part 300, the assembly process is substantially complete. The assembled two-piece belt-line window molding for a motor vehicle is then removed from the molding accommodating groove 720 of the exemplary molding receiving fixture 700 in the exemplary apparatus 1000.

It should be appreciated that, in many cases, alternative exemplary embodiments of an apparatus to those depicted contemplate making certain of the depicted fixed parts alternatively movable and certain depicted movable parts alternatively fixed in varying alternative exemplary embodiments of an apparatus for facilitating assembly of two-piece belt-line window moldings for motor vehicles according to this invention.

While this invention has been described in conjunction with the exemplary embodiments outlined above, various alternatives, modifications, variations and/or improvements may be possible. Accordingly, the exemplary embodiments of the systems and methods according to this invention, as set forth above, are intended to be illustrative, and not limiting. Various changes may be made without departing from the spirit and scope of the invention. Therefore, the systems and methods according to this invention are intended to embrace all now known or later-developed alternatives, modifications, variations and/or improvements.

For example, the flexible main body part 300 need not be entirely flexible, but may instead include both flexible and rigid or semi-rigid portions. Additionally, for example, the cover part 400 may be rigid and non-flexible, or alternatively, may be slightly elastically deformable.

What is claimed is:

1. A method for assembling a molding, comprising:
    pre-assembling the molding by placing one of two inwardly bent longitudinal edges of a cover part, which has a channel configuration and a substantially C-shaped cross-section, in a groove in a flexible main body part, the groove being designed to receive the one of the two inwardly bent longitudinal edges of the cover part;
    placing the pre-assembled molding in a molding receiving fixture usable to hold the cover part in such a manner that the cover part cannot be substantially flexed when a pushing force is applied to the pre-assembled molding;
    applying the pushing force to the flexible main body part of the pre-assembled molding, causing the flexible main body part to at least one of flex and compress under the pressure of the pushing force;
    sliding the flexible main body part past the other of the two inwardly bent longitudinal edges of the cover part;
    seating the other of the two inwardly bent longitudinal edges of the cover part in a groove in the flexible main body part designed to receive the other of the two inwardly bent longitudinal edges of the cover part, by releasing the pushing force allowing the flexible main body part to return toward an unflexed and uncompressed state inside the channel of the cover part such that the two parts form an assembled molding; and
    removing the assembled molding from the molding receiving fixture.

2. The method of claim 1, wherein the pushing force is applied to an entire longitudinal length of the flexible main body part of the pre-assembled molding at a same time.

3. The method of claim 1, wherein the pushing force is applied incrementally at least one of (a) discrete parts and (b) continuous points, along a longitudinal length of the flexible main body part of the pre-assembled window molding.

4. The method of claim 1, wherein the at least one of flexing and compressing of the flexible main body part is substantially isolated to a thinner flexing portion of an exterior portion of the flexible main body part.

5. The method of claim 4, wherein the thinner flexing portion gradually decreases in thickness from the rest of the exterior portion of the flexible main body part, and when the pushing force is applied, the thinner flexing portion is flexed at different rates along the length of the thinner flexing portion, depending on the thickness.

6. The method of claim 1, further comprising, applying a pulling force along a longitudinal length of the flexible main body part of the pre-assembled window molding on an opposite side of the flexible main body part from the groove in the flexible main body part designed to receive the other of the two inwardly bent longitudinal edges of the cover part while the pushing force is applied to the flexible main body part to aid in sliding the flexible main body part past the other of the two inwardly bent longitudinal edges into the channel in the cover part and seating the other of the two inwardly bent longitudinal edges in the groove in the flexible main body part.

7. The method of claim 1, wherein, once the flexible main body part returns toward an unflexed and uncompressed state inside the channel of the cover part, a slight gap remains between each of the two inwardly bent longitudinal edges of the cover part and the grooves in the flexible main body part designed to receive the two inwardly bent longitudinal edges of the cover part.

8. The method of claim 1, further comprising pushing the cover part away from an exterior portion of the flexible body part in the assembled window molding by an elastic deflection force exerted by a flexible spring lip on the exterior portion of the flexible main body part.

9. The method of claim 1, wherein the cover part is a substantially non-flexible cover part.

10. The method of claim 1, wherein the cover part is a metal cover part.

11. The method of claim 10, wherein the metal cover part has an exterior face, and a finish is applied to the exterior face.

12. The method of claim 11, wherein the finish applied to the exterior face of the cover part is at least one of anodized, chromium-plated, polished and painted.

13. The method of claim 1, wherein the cover part is pre-bent at least one longitudinal end, and in the pre-assembled window molding the flexible main body is placed such that a longitudinal end of the flexible main body part is inside the pre-bent at least one end of the cover part.

14. The method of claim 1, wherein the flexible main body part is usable to provide a sealing engagement with the periphery of a movable window glass to restrict at least one of environmental elements, debris and other matter from entering an area between the movable window glass and a body structure within which the movable window glass can be extended and retracted.

15. The method of claim 1, wherein the flexible main body part is constructed of a plurality of rubber-like elastic materials of varying hardness.

16. The method of claim 15, wherein the plurality of rubber-like elastic materials of varying hardness include at least one of a thermoplastic elastomer, a thermoplastic resin, a nylon resin, a polypropylene resin, a semi-hard rubber, an elastic elastomer and soft rubber.

17. The method of claim 1, wherein the flexible main body part includes a projecting ridge portion formed adjacent to the groove in the flexible main body part designed to receive the other of the two inwardly bent longitudinal edges of the cover part, the projecting ridge portion riding over the other of the two inwardly bent longitudinal edges of the cover part facilitating additional flexing and compressing of a thinner flexing portion of an exterior portion of the flexible main body part and providing additional surface area to improve seating of the other of the two inwardly bent longitudinal edges in the groove.

18. The method of claim 1, wherein an exterior face of the cover part is covered with a removable protective cover.

19. The method of claim 18, wherein the removable protective cover is at least one of an adhesive tape and a film.

20. The method of claim 19, further comprising removing the removable protective cover from the exterior face of the cover part when the removable protective cover is no longer required.

21. The method of claim 1, wherein the assembled molding is a belt-line window molding for a motor vehicle.

22. A method for assembling a flexible molding main body part and a cover part as a molding, comprising:
    providing a molding receiving fixture having a molding accommodating channel, an inner cross-section contour of the molding accommodating channel having a shape substantially identical to an outer cross-section contour of the cover part, the molding accommodating channel being formed in a channel configuration and having a substantially C-shaped cross-section; and moving one of the molding receiving fixture and a pushing force exerting unit opposing the molding receiving fixture toward another of the molding receiving fixture and the pushing force exerting unit to assemble the molding, wherein, the cover part and the flexible molding main body part are mounted in the molding receiving fixture, a pushing force is exerted against the cover part and the flexible molding main body part when at least one of the molding receiving fixture and the pushing force exerting unit is moved toward the other, and the molding accommodating channel does not allow the cover part to bend or excessively deform while the flexible main body part is forced to at least one of flex and compress under a pressure of the pushing force such that the cover part and the flexible molding main body part are assembled as the molding.

* * * * *